(12) United States Patent
Maltz

(10) Patent No.: US 6,637,849 B2
(45) Date of Patent: Oct. 28, 2003

(54) SYSTEMS AND METHODS FOR HUE CONTROL

(75) Inventor: Martin S. Maltz, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 5 days.

(21) Appl. No.: 10/046,156

(22) Filed: Jan. 16, 2002

(65) Prior Publication Data

US 2003/0132984 A1 Jul. 17, 2003

(51) Int. Cl.$^7$ ................................................ B41J 2/205

(52) U.S. Cl. .............................. 347/15; 347/43; 358/1.9

(58) Field of Search .......................... 347/15, 43, 14, 347/19; 358/502, 518, 520, 521, 533

(56) References Cited

U.S. PATENT DOCUMENTS 6,435,657 B1 * 8/2002 Couwenhoven et al. ...... 347/43

* cited by examiner

Primary Examiner—Lamson Nguyen
(74) Attorney, Agent, or Firm—Oliff & Berridge, PLC

(57) ABSTRACT

The invention provides a system and method for reducing or eliminating kinks in ink limit conversion processes. In particular, an adjusted ink limit conversion process is provided which approaches the limit in a smooth fashion. Moreover, extrapolated values in the input, values that are outside of a predetermined range, are handled in a smooth fashion. The extrapolated values are used to avoid kinks in the conversion process at the end bounds of the range. Ink limiting is performed gradually as the system approaches the ink limit, avoiding sudden changes in the slope of the system response characteristics. If one of a plurality of colors reaches zero ink, the remaining colors are decreased by multiplying them by a factor less than one. Accordingly, the colorant ratio is maintained, and hue shifts are reduced.

14 Claims, 5 Drawing Sheets

SYSTEMS AND METHODS FOR HUE CONTROL

BACKGROUND OF THE INVENTION

1. Field of Invention

This invention relates to systems and methods for reducing or eliminating hue shifts contours, and other undesirable artifacts in an output image.

2. Description of Related Art

Digital reproduction, transfer or display of various images can occur using a variety of image processing devices and systems in a variety of environments. A source image may be input into a device, processed in some manner, and then output for reproduction or printing as a color output image. The generation of color output image can be thought of as a two step process. In the first step, Red, Green, Blue (RGB) image signals representative of the input image are produced by, for example, a scanner or a work station on a CRT display. Thereafter, a printer can receive the RGB image signals, convert them to Cyan, Magenta, Yellow, Key or Black (CMYK) printer signals and, if desired, generate a hard copy reproduction in accordance thereto. Many printers used in the art have uniquely defined colorants that effect print capabilities. As a result, a select RGB image signal, when converted into a CMYK printer signal, may produce colors that are different to some degree. Each individual printer can be provided with unique multidimensional look-up tables that have been built to convert the RGB image signals into proper CMYK printer signals.

The printer can print a limited range of colors, or "gamut," due to the physical limitations of the marking process. A colorimetric rendering should accurately reproduce any in gamut color. It should also do something sensible for out of gamut colors. While the calorimetric intent is optimized for spot color, it should still operate gracefully for images, which may contain sweeps possibly crossing the gamut boundary. Hence smoothness of sweeps is an important consideration in the design of the algorithm. The colorimetric intent achieves these criteria by using a data extrapolation algorithm for all colors in gamut and near the gamut surface, and an explicit gamut mapping algorithm for all colors that are far from the gamut surface. The gamut mapping is done using an algorithm that produces the printable color that is nearest to the requested color of the same hue (in hue-corrected CIELAB space). A linear blend is then done between the two algorithms to ensure a smooth transition from in-gamut to out-of-gamut regions. Relative colorimetry is used for calorimetric reproduction of in-gamut colors.

As well known in the art, color may be specified in coordinate systems. For example, color may be measured in terms of three components, $L^*$ which roughly corresponds to a lightness-darkness scale, $a^*$ which roughly corresponds to a red-green scale, and $b^*$ which roughly corresponds to a yellow-blue scale. An ink limit function may be used for building the multidimensional lookup tables to convert, for example, from the $L^*a^*b^*$ coordinates to the CMYK coordinates. The multi-dimension lookup tables can be built and applied as part of the conversion process.

In some applications, it may be necessary or desirable to convert an inputted image between the input and the output of one image device for the specific purpose of using the converted image data by at least one other image device. In other applications, it may be necessary or desirable to convert the input image for some particular application within an image device itself. During the conversion process, it may be desirable or necessary to maintain the hues, that is the ratio of the various colors in the image, such CMYK.

In order to reproduce an output image with high quality after the conversion process, it is preferable that the total color area coverage does not exceed the limit of the image output terminal. That is, when the total color area coverage exceeds the limit of the image output terminal, the various color values need to be decreased. However, decreasing the color values by equal amounts may produce kinks, or artifacts, in the image output terminal response. That is, if the one of the colors reaches zero in quantity, and the remaining colors are reduced by equal amounts, kinks in the image output terminal response may occur which may cause contours, undesirable hue shifts and other artifacts which ultimately deteriorate the image data.

FIG. 1 shows one exemplary three-dimensional color plot 100 of a system characteristic curve. As shown in FIG. 1, as the amount of black increases and the total area coverage allowed, that is, the ink limit, decreases, the color values, i.e., cyan, magenta or yellow values are reduced. The solid line 102 in FIG. 1 shows the system response characteristic obtained if CMY values are reduced by equal amounts. As shown in FIG. 1, there are abrupt changes, or "bending," in the slope of the solid line as one of the colorants goes to zero, and thus, as the CMY values approach the white point, kinks may result, for example, in the $L^*a^*b^*$ to CMYK conversion process.

If there are kinks in the $L^*a^*b^*$ to CMYK conversion process, interpolation between the nodes in the multidimensional lookup tables from the $L^*a^*b^*$ coordinates to the CMYK coordinates can give inaccurate results. Moreover, these errors can produce unpleasant artifacts such as hue shifts and contours in the images.

Artifacts stemming from these kinks in the $L^*a^*b^*$ to CMYK conversion process can be perceptible to the human eye, and thus are unacceptable for an output image. That is, if the image is output without adjusting for these kinks, the output image will include the artifacts. These artifacts, even if only a few mils or tens of microns in size, are well within the visual acuity of the human eye. Since the human eye can sense these artifacts, the quality of the resulting image suffers greatly even for small artifacts.

Accordingly, there is a need for systems and methods that reduce or eliminate unacceptable hue shifts and contours in an output image caused by kinks, or bending, that occurs during the interpolation between the nodes in the multidimensional lookup tables from converting the $L^*a^*b^*$ coordinates to the CMYK coordinates.

SUMMARY OF THE INVENTION

In the various exemplary embodiments of the systems and methods of this invention, kinks, or bending that occurs during the ink limit conversion process at the ink limit are reduced or eliminated.

In the various exemplary embodiments of the systems and methods of this invention, an adjusted ink limit conversion process is provided which approaches the limit in a smooth fashion.

In the various exemplary embodiments of the systems and methods of this invention, extrapolated values in the input, values that are outside of a predetermined range, are handled in a smooth fashion.

In the various exemplary embodiments of the systems and methods of this invention, extrapolated values are used to avoid kinks in the L*a*b* to CMYK conversion process at the end bounds of the range.

In the various exemplary embodiments of the systems and methods of this invention, ink limiting is performed gradually as the system approaches the ink limit, avoiding sudden changes in the slope of the system response characteristics.

In the various exemplary embodiments of the systems and methods of this invention, if one of a plurality of colors reaches zero ink, the remaining colors are decreased by multiplying them by a factor less than one. This maintains the colorant ratio, and reduces hue shifts.

As shown in FIG. 1, the dashed curve is an example of the system response characteristic achieved by the various exemplary embodiments of this invention. As shown in FIG. 1, the dashed curve changes direction in a smooth way, and hue is preserved as it approaches the white point.

These and other features and advantages of this invention are described in or are apparent from the following detailed description of the exemplary embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
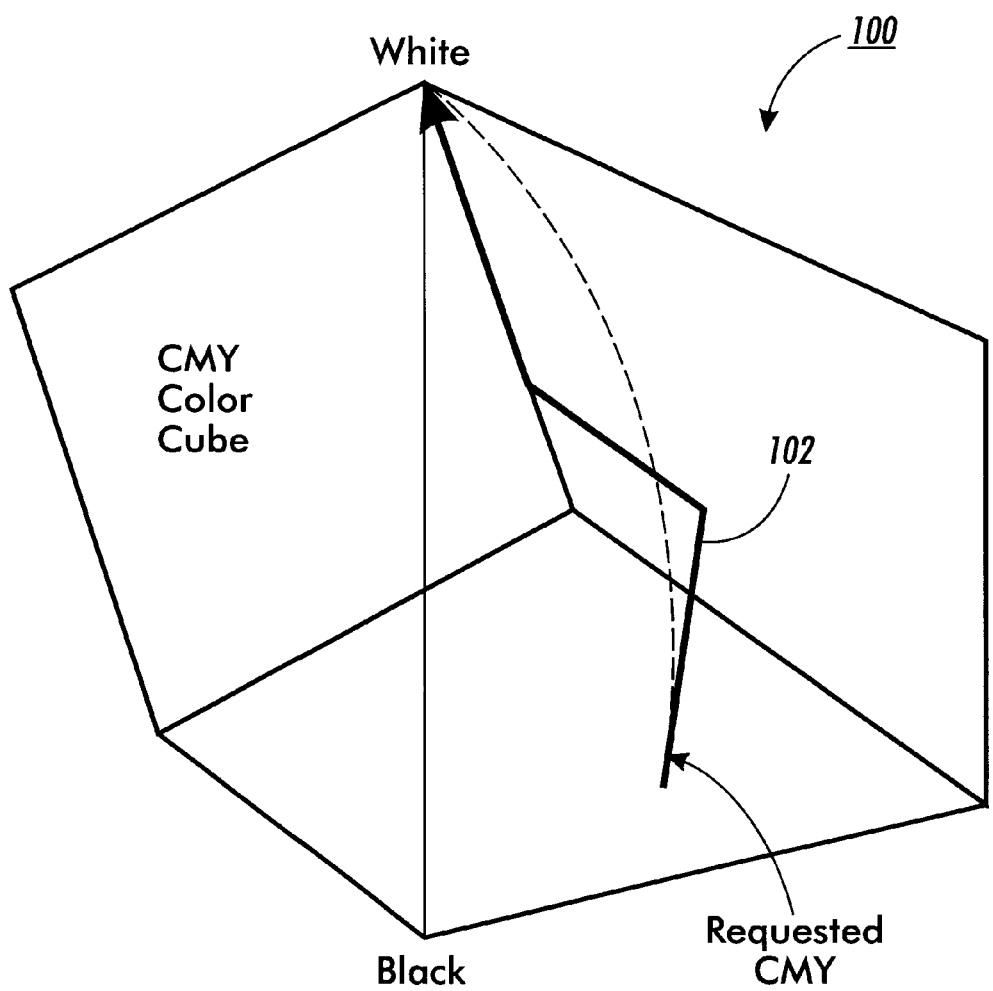
FIG. 1 shows one exemplary plot of system characteristic curve.
Figure 2:
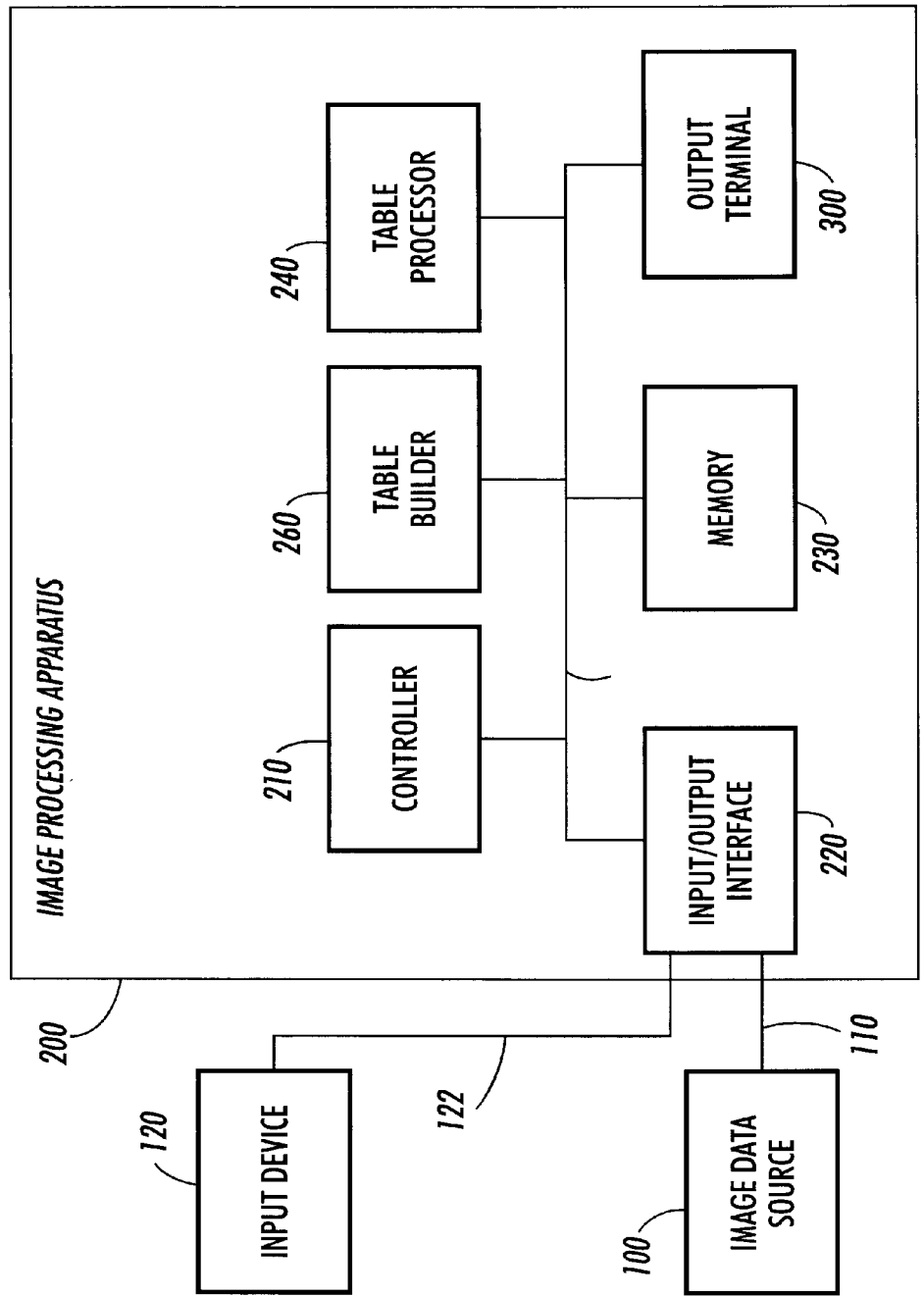
FIG. 2 is a generalized block diagram showing an exemplary embodiment of an image processing system according to the present invention.

FIG. 2 shows an exemplary embodiment of an image processing apparatus 200 incorporating hue control in accordance with this invention. As shown in FIG. 2, an image data source 100 and an input device 120 are connected to the image processing apparatus 200 via links 110 and 122, respectively. The image data source 100 can be a digital camera, a scanner, or a locally or remotely located computer, or any other known or later developed device that is capable of capturing, generating or otherwise providing electronic image data. Similarly, the image data source 100 can be any suitable device that stores and/or transmits electronic image data, such as a client or a server of a network. The image data source 100 can be integrated with the image processing apparatus 200, or the image data source 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from electronic image data, the electronic image data could have been generated at any time prior to printing. Moreover, the electronic image data need not have been generated from an original physical document, but could have been created electronically using any drawing application, such as drawing or CAD software. The image data source 100 is thus any known or later developed device which is capable of supplying electronic image data over the link 110 to the image processing apparatus 200. The link 110 can thus be any known or later developed system or device for transmitting the electronic image data from the image data source 100 to the image processing apparatus 200.

The input device 120 can be any known or later developed device for providing control information from a user to the image processing apparatus 200. Thus, the input device 120 can be a control panel of the image processing apparatus 200, or could be a control program executing on a locally or remotely located general purpose computer, or the like. As with the link 110 described above, the link 122 can be any known or later developed device for transmitting control signals and data input using the input device 120 from the input device 120 to the image processing apparatus 200.

As shown in FIG. 2, the image processing apparatus 200 can include a controller 210, an input/output interface 220, a memory 230, a table processor circuit or routine 240, a table builder circuit or routine 260 and an image output terminal 300, each of which can be interconnected by a control and/or data bus 250. The links 110 and 122 from the image data source 100 and the input device 120, respectively, are connected to the input/output interface 220. The electronic image data from the image data source 100, and any control and/or data signals from the input device 120, are input through the input interface 220, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed memory device.

The image processing apparatus 200 shown in FIG. 2 is connected to the image output terminal 300 over the control and/or data bus 250. Alternatively, the image output terminal 300 may be an integral part of the image processing apparatus 200. An example of this alternative configuration would be a digital copier or the like. It should be appreciated that the image processing apparatus 200 can be any known or later developed type of image processing apparatus. It is to be understood that the image processing apparatus 200 can take any form without departing from the spirit and scope of the present invention.

The links 110 and 122 can be any known or later developed device or system for connection, including a direct cable connection, a connection over a wide area network or a local area network, a connection over an intranet, a connection over the Internet, or a connection over any other distributed processing network or system. In general, the links 110 and 122 can be any known or later developed connection system or structure usable for connection.

The memory 230 can temporarily store image data, prior to processing, that has been input from the image data source 100 into the image processing apparatus 200. The image data may be input from the image data source 110 through the input/output interface 220, or, alternatively, may result from retrieving an image previously stored in the image processing apparatus 200. The memory 230 can be implemented as a separate entity or, for example, as part of the table builder circuit or routine 260 to store appropriate information for transforming an image or a portion of an image that possesses hue color.

In various exemplary embodiments, the table processor circuit or routine 240 can determine an appropriate hue color for the image data to be output based on a table 248 that has been created by a table builder 260. For example, the table 248 that includes a set of transformations to impose hue control on an image can be created prior to image processing. The table processor circuit or routine 240 can then use the table 248, and any control signals from the input device 120, the image data source 100 and the image output terminal 300 to output an image with reduced or eliminated kinks or bending. More specifically, the table processor circuit or routine 240 can use the table 248 to adjust the image data and output the adjusted image data to the image output terminal 300 over the control and/or data bus 250. That is, based on the adjustments made by the table processor circuit or routine 240 using the table 248, the table processor circuit or routine 240 controls the output of image signals to the image output terminal 300. Accordingly, when the output images are output to the image output terminal 300, the resulting image will be output on a receiving substrate or display with the eliminated or reduced image artifacts.

In various exemplary embodiments according to this invention, it should be appreciated that the creation of the table for imposing hue control can be performed offline prior to the image processing phase or online during the image processing phase, but does not necessarily have to be created and used for every processed image.

While FIG. 2 shows the table processor circuit or routine 240 and the image output terminal 300 as portions of an integrated system, the table processor circuit or routine 240 could be provided as a separate device from the image output terminal 300. That is, the table processor circuit or routine 240 may be a separate device attachable upstream of a stand-alone image output terminal 300. For example, the table processor circuit or routine 240 may be a separate device which interfaces with both the image data source 100 and the image output terminal 300.

Furthermore, the table processor circuit or routine 240 may be implemented as software on the image processing apparatus 200 or the image data source 100. It is to be understood that other configurations of the elements shown in FIG. 2 may be used without departing from the spirit and scope of this invention.

Figure 3:
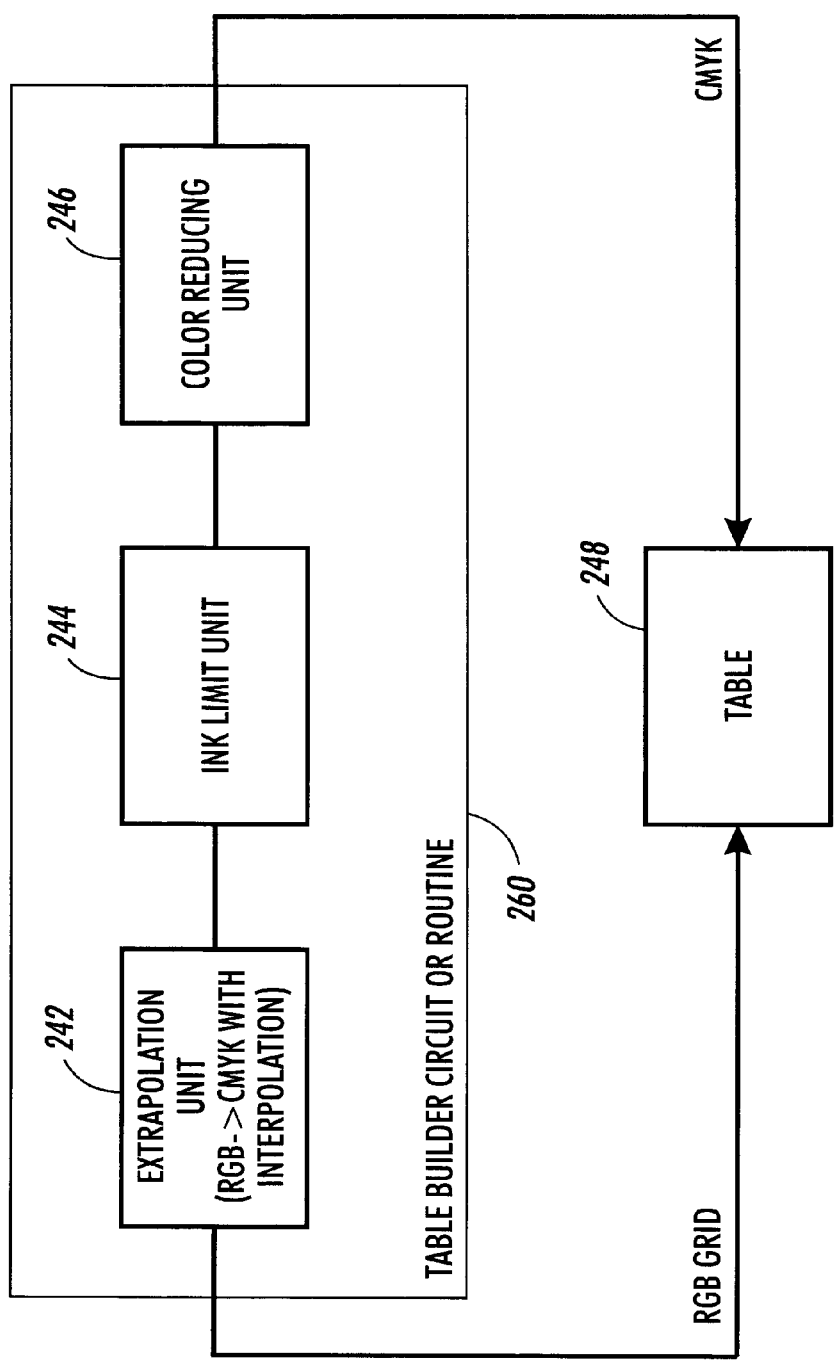
FIG. 3 shows one embodiment of a preferred table building circuit or routine according to the present invention.

FIG. 3 shows an embodiment of an exemplary table builder circuit or routine 260 according to this invention that can be used by the table processor circuit or routine 240. As shown in FIG. 3, the table builder circuit or routine 260 can include an extrapolation unit 242, an ink limit unit 244, and color reducing unit 246. Moreover, the table builder circuit or routine 260 can include a table 248. It should be appreciated that the table 248 can be incorporated as part of the table builder 260 or a separate entity apart from the table builder 260.

It should also be appreciated that the table 248 can be any known or later known table that can be used to convert one type of color coordinates to another type of color coordinates. For example, the table 248 can be a multidimensional lookup table that has been built to convert RGB image signals into proper CMYK printer signals. With this type of multidimensional look-up table, an ink limit function may be used for building the table 248 to convert, for example, $L^*a^*b^*$ coordinates to the CMYK coordinates.

In FIG. 3, when the total color area coverage exceeds the ink limit the image output terminal 300 could handle, the table builder circuit or routine 260 decreases the various colors, i.e., cyan, magenta and yellow. The table builder circuit or routine 260 decreases the cyan-magenta-yellow value using an adjusted ink limit function which approaches the ink limit in a smooth fashion. That is, the extrapolation unit 242 determines extrapolated values in the input that are outside of the graylevel range of 0 to 255. The ink limit unit 244 handles the determined extrapolated values in a smooth fashion. For example, the extrapolated values are used to avoid kinks in the $L^*a^*b^*$ to CMYK function at 0 and 255. The ink limit unit 244 gradually performs this ink limit function as the system approaches the ink limit, avoiding sudden changes in the slope of the system response characteristics. If one of cyan, magenta and yellow reaches zero ink, the color reducing unit decreases the two remaining colors by multiplying them by a factor less than one. Thus, the table builder circuit or routine 260 maintains the colorant ratio, and reduces hue shifts.

For example, if the total cyan-magenta-yellow is reduced by a value R, where $$R=C+M+Y+K-I, \text{ whenever } C+M+Y+K>I,$$

and

R is the reducing value,
C is the cyan value,
M is the magenta value,
Y is the yellow value,
K is the black value, and
I is the ink limit, an unavoidable kink in the transformation may occur. Accordingly, in accordance with the various exemplary embodiments of this invention, the ink limit unit 244 applies an adjusted ink limit function, $$Z(x, \alpha).$$

$Z(x, \alpha)$ goes smoothly from 0 for x<0 to x for x>0, where $\alpha$ is the range of the transition.

In accordance with this exemplary embodiment, the color reducing unit 246 reduces the cyan-magenta-yellow value by $$R=Z(C+M+Y+K-1, \alpha),$$

Accordingly, kinks in the conversion process can be avoided.

Reducing Function

The color reducing unit 246 performs a reducing function to help avoid kinks that can occur during the conversion process. First, cyan, magenta and yellow are reduced by equal amounts. That is, black is essentially subtracted from the cyan-magenta-yellow value CMY to make up for the black K added. This reduction, Rs, should be about R/3, except where limited by the value of the smallest cyan, magenta or yellow separation, which will be called S. For S>0, this function Frs(R, S) is:

$$Rs=Frs(R, S)=R*S/(3*S+Z(R-3*S, \alpha)),$$

where,

Rs is the value that can be subtracted from cyan, magenta and yellow separations without making any of them negative, R is the total value that must be subtracted from cyan, magenta and yellow, S is the smallest of cyan, magenta and yellow values, and α is the range of the transition.

The function Frs(R, S) is R/3 for R/3<<(much less than) S, and S for R/3>>(much grater than) S, and transitions smoothly between these two behaviors. Thus, the difference between S and Rs, i.e., S−Rs, therefore smoothly approaches 0 when R/3>S, as desired. Rs is also zero if either R or S is zero, which is also desirable. After Rs has been subtracted, new cyan-magenta-yellow values are obtained.

When R/3>S, the new value C'+M'+Y'+K−I, will still be greater than 0,
where

C' is the new cyan value,

M' is the new magenta value, and

Y' is the new yellow value.

Accordingly, the new cyan-magenta-yellow values CMY must be further reduced. Since the smallest value S=0, equal amounts of cyan-magenta-yellow CMY cannot be subtracted. Accordingly, the ratio (i.e. the hue) of the two remaining colorants are kept constant. Therefore, the new values C', M' and Y' are multiplied by a factor, Rf, to obtain the final cyan-magenta-yellow values.

To find Rs, additional reduction R' is determined, where $$R'=Z(C'+M'+Y'+K-I, α).$$

The new cyan-magenta-yellow value is decreased by the additional value R', $$R'=C'+M'+Y'-C''+M''+Y''=(1-Rf)*(C'+M'+Y'),$$

where

C'' is the new cyan value,

M'' is the new magenta value, and

Y'' is the new yellow value,

Accordingly, the multiplying factor is $$Rf=1-R/(C'+M'+Y').$$

To make sure this function approaches zero without any kinks, it is modified to read:

$$Rf=Z(1-R'/(Z(C'+M'+Y', α)+CMYmin), α/1).$$

where

CMYmin is a very small positive value chosen to avoid "divide by zero" problems in the calculation.

Since the simple min(C, M, Y) function has kinks (slope discontinuities), a smoother minimization function is used to find S:

$$Min2=M-Z(M-Y, α)$$

This Min2 function is a symmetric function (Min2(M, Y)=Min2(Y,M)) that evaluates to Y for Y≦M and M for ≧M. Accordingly, a further minimization function, $$Min3=C-Z(C-Min2, α),$$

provides a smooth minimization function for three variables. Because C=α/2, M=Y=0, for example, does not give the same result as M=α/2, C=Y=0, to provide symmetry, Min3 is evaluated for the three possible parameter choices for Min2 (CM, MY, and YC), and the three results are averaged together.

Smoothing Function

The smoothing function provided is z=0 for x<−α, and z=x for x>α. In between, −α≦x≦α, the smoothing function is a parabolic function of slope 0 at x=−α and 1 at x=α.

Extrapolation

To avoid kinks in the L*a*b* to CMYK conversion process, the values of CMYK may be less than 0 and greater than 255. The ink limit function must therefore be able to handle such values. First, the CMYK values are smoothly limited so to be between −α and (255+α). A parabolic function is used to go from the slope 1 region at x=255, z=255 to the slope 0 asymptote at x=255+2*α, z=255+α. A similar function is used between x=0, z=0, and x=2*α, z=α.

Allowing negative values means that there are conditions for which the specified ink limit is slightly exceeded. If the cyan value C is negative, for example, the sum of magenta, yellow and black, M+Y+K, could be as large as the limit plus α. Exceeding the ink limit by these small amounts is generally acceptable.

If the ink limit is set at 400%, and the cyan-magenta-yellow value is 255, as the black value K is swept from a value of 0 to a value much larger than 255, the new cyan-magenta-yellow (the output of the ink limit function) will smoothly decrease from 255 to (255−α/3) as the black value K passes the 255 point. This small amount in cyan-magenta-yellow is also generally acceptable.

Since S can also be negative, Rs=−Frs (R,−S) when ever S<0 in order to avod "divide by zero" problems in the calculation.

It is to be appreciated that alternative methods of controlling the hue are possible.

An exemplary embodiment of the hue control of the systems and methods of this invention is outlined in detail below with respect to FIGS. 4–5.

Figure 4:
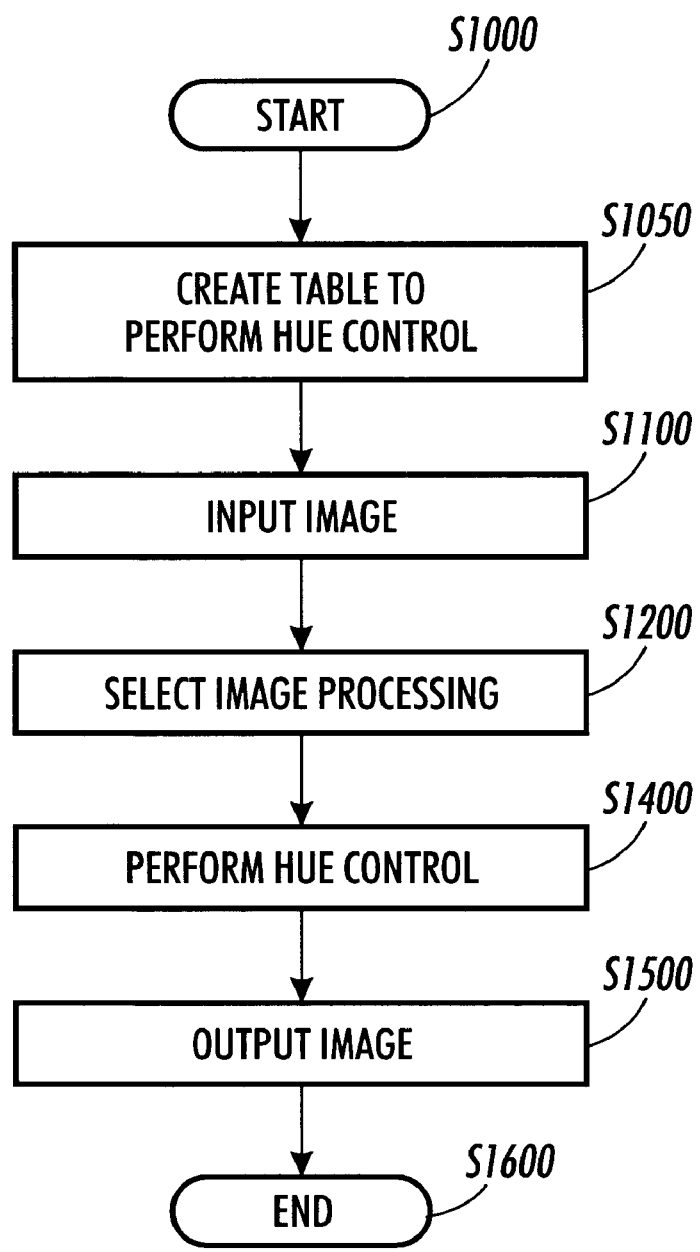
FIG. 4 is a flowchart outlining one exemplary embodiment of a method for image processing according to the present invention.

FIG. 4 is a flowchart outlining an exemplary image processing method according to this invention. Beginning at step S1000, control continues to step 1050 where a table is created that includes a set of transformations that allow hue control to be performed during the conversion process. As previously discussed, the table can created or built prior to the image processing, i.e., offline prior to a conversion phase, or online during the image processing phase, but does not necessarily have to be created and used for every processed image. Next, in step S1100, the input image information is received and input. Then, in step S1200, image processing selections, such as brightness adjustment values and contrast adjustment values are received. Control then continues to step S1400.

In step S1400, the hue control is performed based on the table that has been created that includes the set of transformations. The table processor circuit or routine 240 uses the set of transformations that have been built into the table to perform hue control as previously discussed. Control then continues to step S1500. In step S1500, the adjusted image data having the hue control is output to the image output terminal where the image is output. Control then continues to step S1600 where the control sequence ends.

Figure 5:
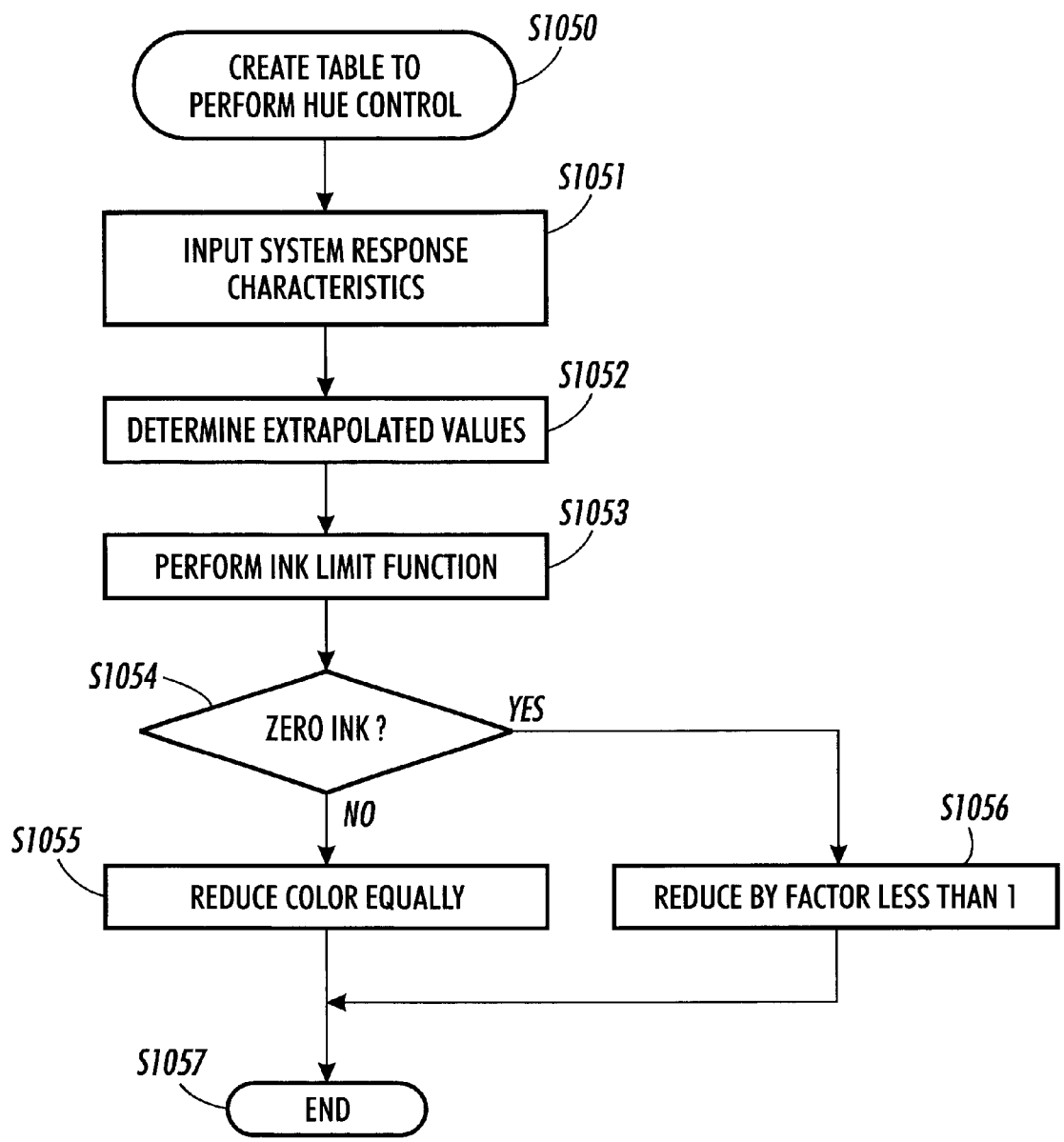
FIG. 5 is a flowchart outlining in greater detail the step of creating a table to perform hue control of FIG. 4.

FIG. 5 illustrates in greater detail the step in FIG. 4 of creating a table that includes a set of transformations to perform hue control. Control begins in step S1050 and continues to step S1051, where the system response characteristics are input. Next, in step S1052, extrapolated values in the input that is outside of the graylevel range of 0 to 255 are determined. Then, in step S1053, and ink limit process is performed on the extrapolated values. That is, changes in the slope of the system response characteristics are smoothed at the extrapolated values as it approaches the ink limit. Control then continues to step S1054.

In step S1054, control determines whether or not any of the colors reaches zero ink. If not, control continues to step S1055, where the colors are equally reduced. Otherwise, control jumps to step S1056, where the non-zero colors are reduced by a factor of less than 1. Control then continues to step S1057 where the control sequence returns to step S1100.

The image processing apparatus 200 shown in FIG. 2 is preferably implemented on a programmed general purpose computer. However, the image processing apparatus 200 shown in FIG. 2 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 4 and 5, can be used to implement the image processing apparatus 200.

In particular, it should be understood that each of the circuits shown in FIG. 2 can be implemented as portions of a suitably programmed general purpose computer. Alternatively, each of the circuits shown in FIG. 2 can be implemented as physically distinct hardware circuits within an ASIC, or using a FPGA, a PDL, a PLA or a PAL, or using discrete logic elements or discrete circuit elements. The particular form each of the circuits shown in FIG. 2 will take is a design choice and will be obvious and predicable to those skilled in the art.

The memory 240 is preferably implemented using static or dynamic RAM. However, the memory 240 can also be implemented using a floppy disk and disk drive, a writable optical disk and disk drive, a hard drive, flash memory or any other known or later developed alterable volatile or non-volatile memory device or system.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An image device that controls hue shifts in an output image, comprising:
   a memory that stores image data that has been input from an image data source; and
   a controller that adjusts an appropriate hue color for the input image data by gradually decreasing amounts of various colors in the image data using an adjusted colorant limit function as a total color area coverage approaches a colorant limit.

2. The image device according to claim 1, wherein the various colors include cyan, magenta and yellow colors.

3. The image device according to claim 2, wherein, if an amount of one of the cyan, magenta and yellow colors reaches a zero value, the controller decreases the amounts of the remaining two colors by multiplying the amounts of the remaining two colors by a factor less than one.

4. The image device according to claim 1, wherein the controller further extrapolates color amounts in the input image data that are outside a graylevel range of 0–255.

5. The image device according to claim 1, wherein the controller further maintains a colorant ratio for the amounts of the various colors in order to reduce the hue shifts.

6. The image device according to claim 1, wherein the adjusted colorant limit function is $Z(x, \alpha)$, where $Z(x, \alpha)$ goes smoothly from 0 for x<0 for x>0, and where $\alpha$ is a range of a transition.

7. The image device according to claim 1, wherein a reducing value (R) is used to subtract amounts of cyan, magenta and yellow colors, where the subtracted amounts of cyan, magenta, and yellow colors, when combined, are colorimetrically equivalent to an amount of black, from the amounts of the cyan, magenta and yellow colors equally by using R/3, except where limited by a value (S) of a smallest of the cyan, magenta or yellow colors.

8. A method of controlling hue shifts in an output image of an image device, comprising:
   storing image data that has been input from an image data source; and
   adjusting an appropriate hue color for the input image data by gradually decreasing amounts of various colors in the image data using an adjusted colorant limit function as a total color area coverage approaches colorant limit.

9. The method of controlling hue shifts according to claim 8, wherein the various colors include cyan, magenta and yellow colors.

10. The method of controlling hue shifts according to claim 9, further comprising decreasing amounts of at least two colors by multiplying the amounts of the at least two colors by a factor less than one if the amount of one of the cyan, magenta and yellow colors reaches a zero value.

11. The method of controlling hue shifts according to claim 8, further extrapolating the amounts of the colors in the input image data that are outside a graylevel range of 0–255.

12. The method of controlling hue shifts according to claim 8, further comprising maintaining a colorant ratio for the amounts of the various colors in order to reduce the hue shifts.

13. The method of controlling hue shifts according to claim 8, further comprising an adjusted colorant limit function that is $Z(x, \alpha)$, where $Z(x, \alpha)$ goes smoothly from 0 for x<0 to x for x>0, and where $\alpha$ is a range of transition.

14. The method of controlling hue shifts according to claim 8, further comprising using a reducing value (R) to subtract amounts of cyan, magenta and yellow colors, where the subtracted amounts of cyan, magenta, and yellow colors, when combined, are colorimetrically equivalent to an amount of black, from the amounts of the cyan, magenta and yellow colors equally by using R/3, except where limited by a value (S) of a smallest cyan, magenta or yellow colors.

* * * * *